Dec. 15, 1953 M. OYLER 2,662,328
FISHING TACKLE RETRIEVER
Filed Feb. 1, 1950
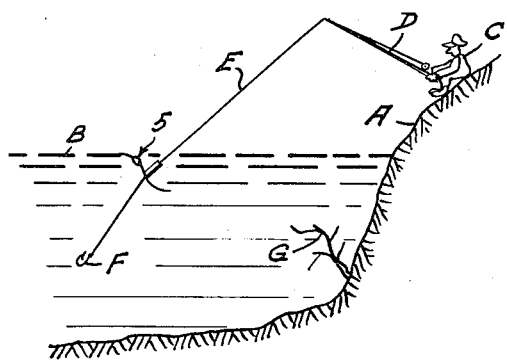
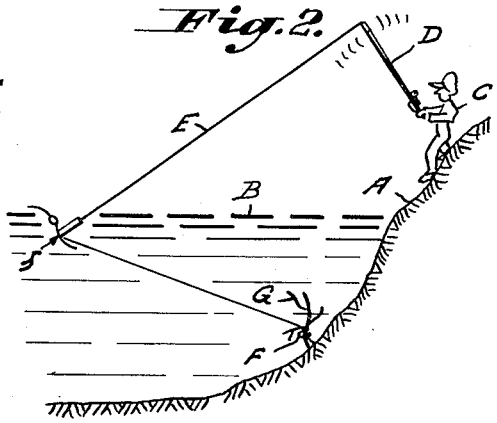
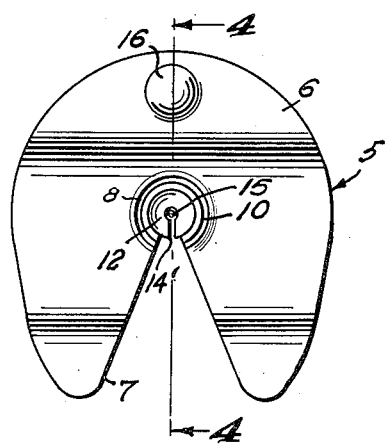
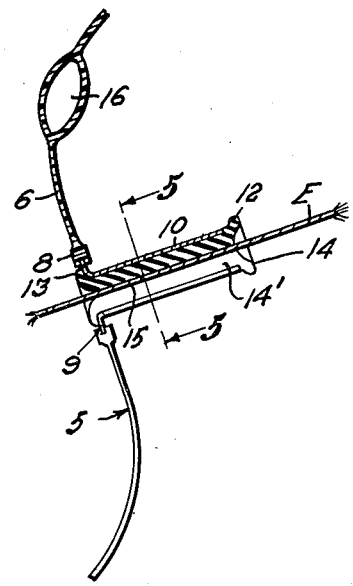
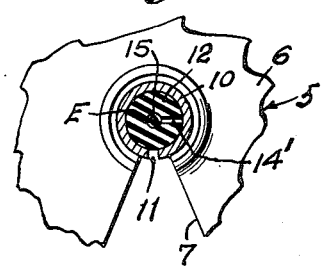
Inventor
Max Oyler
By Patrick D. Beavers
Attorney Patented Dec. 15, 1953

2,662,328

UNITED STATES PATENT OFFICE 2,662,328

FISHING TACKLE RETRIEVER

Max Oyler, Salmon, Idaho

Application February 1, 1950, Serial No. 141,716

4 Claims. (Cl. 43—17.2)

The present invention relates to improvements in fishing appliances and more particularly to a device for retrieving snagged fishing tackle.

The principal object of the present invention is to provide a fishing tackle retriever which can be disposed on a fishing line, and when used in a stream having a current, the retriever will perform certain motions which will tend to liberate a snagged hook.

Another important object of the invention is to provide a fishing tackle retriever which can be readily placed on a fishing line for use in liberating a snagged hook.

A further object of the invention is to provide a fishing tackle retriever, which in addition to performing various movements to facilitate liberation of a snagged hook, will allow for the removal of the liberated hook away from the obstacle, so that there can be no second snagging of the hook, before complete recovery of the tackle has been accomplished.

These and various other objects and advantages of the invention will become apparent to the reader of the following description.

In the drawing:

Figure 1 is a fragmentary side elevational and sectional view showing a fisherman with his fishing apparatus, the line being shown freed from an obstacle.

Figure 2 is a similar view to that of Figure 1, but showing the hook of the line snagged by a submerged obstacle.

Figure 3 is a front elevational view of the retriever.

Figure 4 is a section taken substantially on line 4—4 of Figure 3.

Figure 5 is an enlarged cross sectional view taken on line 5—5 of Figure 4.

Referring to the drawing, wherein like numerals designate like parts, it can be seen that reference character A denotes the bank of a stream B upon which a fisherman C is located with his fishing rod D and fishing line E, which of course has the usual hook F and other appliances not shown. Reference character G denotes a submerged obstacle against which the hook F can be snagged or caught as shown in Figure 2.

When the hook F is snagged as shown in Figure 2, the present invention, referred to as a retriever and generally referred to by numeral 5 is employed and this consists of the plate 6 of sheet metal, plastic or any other suitable material, generally of S shape in edge view or vertical section as shown in Figure 4.

The lower portion of the plate 6 is formed with an inwardly directed V-shaped cut out portion or throat 7 of segmental form which extends inwardly to the center of the plate 6, through a rim 8. The rim 8 is located at the edge portion of a central opening in the plate 6 and is circumferentially grooved to receive the outstanding circumferentially flanged portion 9 of a tube 10, this tube 10 having a longitudinal slit 11 extending from one end to the other thereof.

While it has also been found practical to use an internal tube, preferably with some line protecting lining, as shown in Figure 4, a core 12 of a plastic material, glass or some other line protective material may be employed. This core 12 fits snugly within the tube 10 and has a laterally disposed circumferential portion 13 at its rear end for abutting the outside of the flange 9, while its forward end has a similarly shaped outstanding circumferential portion defining a knob 14. As can be clearly seen in Figure 5, the core 12 has a longitudinally extending slit 14' extending from one end to the other and from its periphery inwardly to a central bore 15.

At the upper portion of the plate 6 an air chamber 16 is provided, or this may be a cork insert to afford buoyancy to the upper portion of the retriever.

It can now be seen that when the hook F is snagged against an obstacle G, the fisherman rotates the core 12 of the retriever until the slit 14' matches the slit 11. He then sets the retriever over the line so that the line enters the bore 15 by way of the slits 14' and 11 and the throat 7 of the plate 6. The fisherman then merely rotates the knob 14, which revolves the core 12 so as to set the slit 14' out of registration with the slit 11. There is then no possibility of the line becoming displaced from the retriever and there is sufficient friction between the core 12 and the tube 10 to maintain the core in this set position.

The retriever is now allowed to ride down the line and will become partly immersed in the water, the buoyant structure 16 serving to hold the retriever adjacent the surface as in the manner shown in Figure 2. The fisherman can then reciprocate the rod D as in the manner suggested in Figure 2, or in instances where there is a substantial current to the stream, the current itself will cause a wobbling motion of the retriever which will substantially assist in detachment of the hook F from the obstacle G.

When the tackle becomes freed from the obstacle, the retriever lifts the tackle to the surface or rather serves as a point removed from the obstacle where the tackle is lifted to the surface when the line is reeled in.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A fishing tackle retriever for fishing lines comprising a structure adapted to be slid along the fishing line when the hook thereof is snagged, said structure being in the form of a plate having a fishing line guide projecting from a portion thereof, said guide being formed with a longitudinal slit through which a fishing line can be disposed for entrance into the guide, and the lower portion of the plate being provided with an inwardly disposed throat leading to and communicating with said slit.

2. A fishing tackle retriever for fishing lines comprising a vertically elongated plate having a V-shaped cut in the lower portion thereof, a tube, said plate having a substantially central opening therein communicating with the V-shaped cut, the edge portion of the plate at the opening being formed with a grooveway, said tube being flanged for disposition in the grooveway, and a core disposed through the tube and having portions at its ends abutting the ends of the tube, said tube having a slot therein, said core having a groove therein registering with the slot, and said V-shaped cut in the plate, said slot and groove forming an avenue for entry of a fishing line into the core.

3. A fishing tackle retriever for fishing lines comprising a vertically elongated plate having a V-shaped cut in the lower portion thereof, a tube, said plate having a substantially central opening therein communicating with the V-shaped cut, the edge portion of the plate at the opening being formed with a grooveway, said tube being flanged for disposition in the grooveway, and a core disposed through the tube and having portions at its ends abutting the ends of the tube, said tube having a slot therein, said core having a groove therein registering with the slot, said V-shaped cut in the plate, said slot and groove forming an avenue for entry of a fishing line into the core, and said plate being substantially S-shaped in vertical section.

4. A fishing tackle retriever for fishing lines comprising a vertically elongated plate having a V-shaped cut in the lower portion thereof, a tube, said plate having a substantially central opening therein communicating with the V-shaped cut, the edge portion of the plate at the opening being formed with a grooveway, said tube being flanged for disposition in the grooveway, a core disposed through the tube and having portions at its ends abutting the ends of the tube, said tube having a slot therein, said core having a groove therein registering with the slot, said V-shaped cut in the plate, said slot and groove forming an avenue for entry of a fishing line into the core, said plate being of substantially S-shape in vertical section, and a buoyant structure at the upper portion of the plate.

MAX OYLER.

References Cited in the file of this patent

UNITED STATES PATENTS

| Number | Name | Date |
|---|---|---|
| 696,433 | Heddon | Apr. 1, 1903 |
| 1,466,601 | Sanders | Aug. 28, 1923 |
| 1,694,195 | Watts | Dec. 4, 1928 |
| 1,802,260 | Kopsho | Apr. 21, 1931 |
| 2,001,241 | De Vries | May 14, 1935 |
| 2,534,790 | Moore | Dec. 19, 1950 |

FOREIGN PATENTS

| Number | Country | Date |
|---|---|---|
| 417,641 | France | Nov. 18, 1910 |
| 780,504 | France | Apr. 27, 1935 |

OTHER REFERENCES

Webster's New International Dictionary, 2nd ed., G. & C. Merriam Co., Springfield, Mass., 1937, page 1884, column 1, "Plate."